United States Patent [19]

Meylan

[11] 4,208,003
[45] Jun. 17, 1980

[54] METHOD OF JOINING SHAFT SECTIONS

[75] Inventor: Pierre Meylan, Neuenhof, Switzerland

[73] Assignee: BBC Brown, Boveri & Company, Ltd., Baden, Switzerland

[21] Appl. No.: 939,956

[22] Filed: Sep. 6, 1978

[30] Foreign Application Priority Data

Sep. 6, 1977 [CH] Switzerland .................. 10837/77

[51] Int. Cl.² ........................................... B23K 31/02
[52] U.S. Cl. ..................................... 228/169; 228/189; 228/216; 228/232; 219/76.1
[58] Field of Search ........... 228/165, 168, 169, 173 E, 228/174, 189, 216, 225, 231, 232; 219/137.2, 137 R, 160, 76.1

[56] References Cited

U.S. PATENT DOCUMENTS

| | | | |
|---|---|---|---|
| 2,233,455 | 3/1941 | Larson | 219/137 R |
| 2,258,913 | 10/1941 | Stone | 219/137 R |
| 2,416,379 | 2/1947 | Cohn | 228/216 |
| 2,963,129 | 12/1960 | Eberle | 228/216 |
| 3,002,191 | 9/1961 | Thielsch | 228/168 |
| 4,060,883 | 12/1977 | Coulon et al. | 29/156.8 R |

FOREIGN PATENT DOCUMENTS

| | | | |
|---|---|---|---|
| 519247 | 12/1955 | Canada | 228/165 |
| 723747 | 8/1942 | Fed. Rep. of Germany | 228/189 |
| 1146603 | 4/1963 | Fed. Rep. of Germany | 219/160 |
| 951207 | 3/1964 | United Kingdom | 219/160 |

Primary Examiner—Daniel C. Crane
Attorney, Agent, or Firm—Burns, Doane, Swecker & Mathis

[57] ABSTRACT

A method of joining shafts is disclosed in which a welded joint is formed between the shaft ends of, for example, a turbine and a generator inside of an assembled turbogenerator structure. A built-up weld portion is provided on the end of each shaft, which is machined to form a welding groove. During installation of the equipment, such as a turbogenerator arrangement, a welding ring is placed onto the end of one shaft. Welding powder is deposited in recesses formed between the shafts and the welding ring. The second shaft is then pressed against the welding ring. The shaft sections are preheated and the groove is supplied with welding material to join the sections while the shafts are being rotated. After completion of the weld, the seam is checked for structural integrity.

7 Claims, 1 Drawing Figure

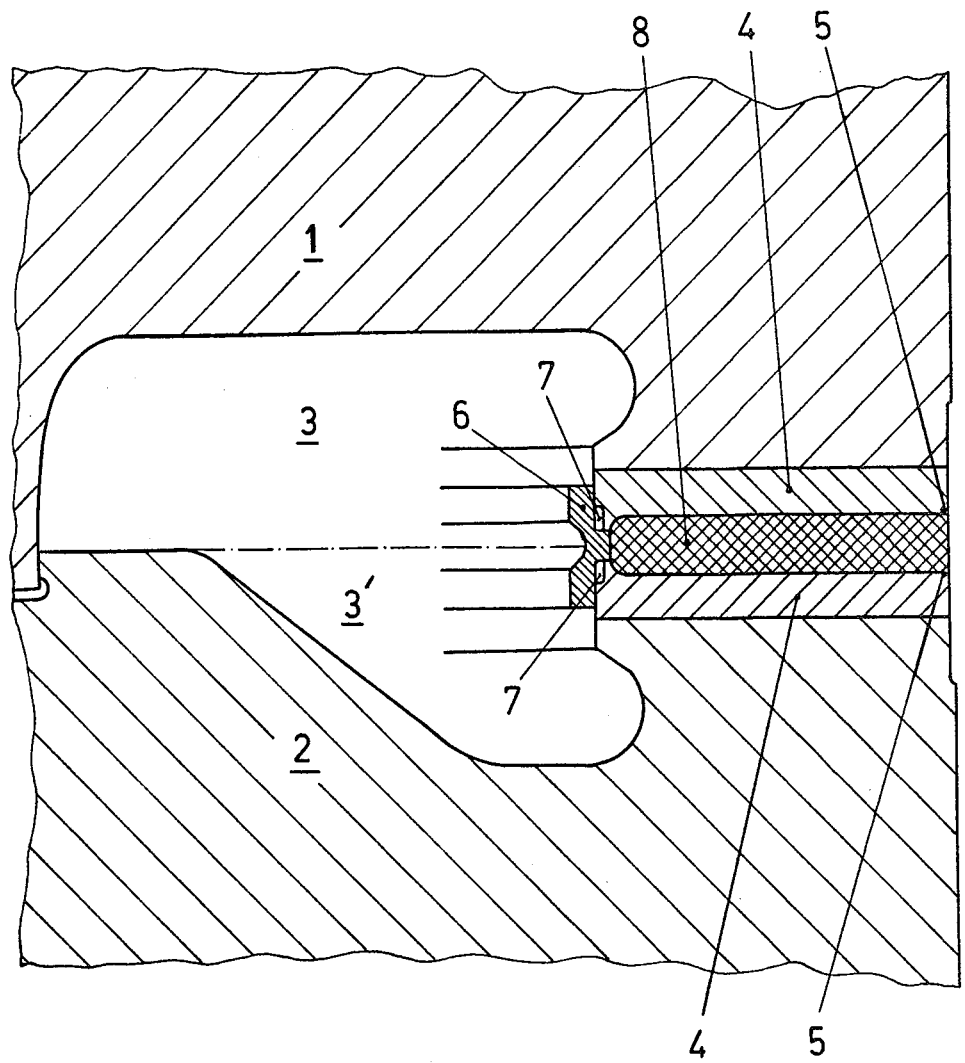

METHOD OF JOINING SHAFT SECTIONS

BACKGROUND AND SUMMARY OF THE INVENTION

The present invention relates to rotary power shaft couplings, and methods of joining two rotary shaft sections together in alignment.

It is known that two shaft ends can be joined together by the use of couplings if the shafts are equipped with coupling flanges. Various types of couplings may be used, such as rigid friction couplings, claw couplings and geared couplings. The rotational motion of the shafts is transferred between faces of the coupling flanges by the friction occuring between two portions of the coupling. The friction is generated by axial forces acting on the shafts. In order to provide for the transfer of a torque which is greater than the torque produced by friction, but without changing any shaft or coupling dimensions, the known friction couplings have been provided with additional shearing elements. The shearing elements are placed between the contacting surfaces of the coupling flanges and typically are in the form of toggle bolts, shear bushings, claws, radially extending shear bolts or wedges, and radial serrations.

Recent developments in the engineering of turbogenerators relating to improvements in the cooling of rotor windings as well as to the use of high-grade materials have suggested the need for generator shafts of a reduced diameter. The reduction in size of the shafts would also require the use of a coupling having a correspondingly smaller-dimension. The coupling, however, must provide a sufficient transfer of torque from the turbine shaft to the generator shaft.

The known couplings for shafts such as are described above have a particular disadvantage in that an offset is required in each coupling both to center the two shaft sections and to absorb the generated shearing forces. At operating speeds, the centrifugal forces generated by the rotation of the shafts may cause the offset in the first coupling flange to expand to a greater degree than the offset in the second flange. Accordingly, the coupling may slide with the expansion causing an eccentricity of the two shaft sections. The eccentricity results in a unbalancing of the rotors. Other known types of couplings are objectionable because they are costly to manufacture and require very accurate machining of the two coupling parts.

It is an object of the present invention to provide a simplified method for connecting two shafts together which does not require costly preparatory work.

It is a further object of the present invention to provide a method of joining shafts together in a manner which can be accomplished without any difficulty at the site of assembly, for example inside an assembled turbogenerator structure, and which will insure a maximum transfer of torque with a minimum shaft dimension.

The process of the present invention accomplishes these and other objects by means of a coupling that is made by depositing weld material of a low alloy steel on the opposing end faces of the shaft sections. The two shaft sections are then annealed by a thermal treatment which generates a minimum of stresses in the shaft sections. A welding groove is machined in the welded portion of each shaft section.

When it is desired to assemble the shaft sections together inside of the turbine and generator structure, a welding ring is inserted in a groove in one of the two shaft sections and the other shaft section is positioned in end-to-end abutting relation with the first shaft section, with the welding ring received in a corresponding groove in the second shaft section. The two shaft sections are then heated up to a temperature sufficient to cause fusion of a welding powder that is progressively deposited in the welding groove formed between the abutting ends of the two shaft sections. The welding powder is deposited in the welding groove while the two shaft sections are being rotated. The welded coupling is then allowed to cool.

BRIEF DESCRIPTION OF THE DRAWINGS

The present invention will be described with reference to a preferred embodiment as shown in the accompanying drawing wherein like members bear like reference numerals. The single drawing is a radial cross-sectional view of a pair of shaft sections joined together by a weld formed according to the method of the present invention.

BRIEF DESCRIPTION OF THE PREFERRED EMBODIMENT

With reference to the single drawing, a shaft end 1, for example, of a turbine, is joined to a shaft end 2, for example, of a generator. The shaft ends 1 and 2 are each provided with balancing grooves 3 and 3'. At the manufacturing plant a build-up weld portion 4, which preferably consists of a low-alloy steel, is deposited onto each of the two shaft sections 1 and 2 which are to be joined together. Before depositing the low-alloy steel to form the built-up portion 4, the shaft ends 1 and 2 are heated to approximately 250° C. to provide for a uniform hardness of the weld material. The shaft sections are annealed by means of a thermal treatment which generates a minimum of stresses and are machined into a preferred configuration, with a welding groove 5 provided in each shaft section. Any of the known annealing processes may be used to treat the shaft ends.

At the assembly site of the structure, a welding ring 6 is loosely fitted onto one of the two shafts, for example shaft 1. The welding ring 6 is retained in place during heating of the shaft section, as will be discussed below. A conventional welding powder is deposited in a recess 7 in each shaft section in order to provide protection for the base of the welding seam against oxidation. The second shaft section 2 is then pressed against the welding ring 6.

Both shaft sections are pre-heated up to a maximum temperature of about 250° C. Since the shafts are installed inside the turbine and generator structure, the heating is necessary to prevent damage to bearings which have been previously installed. Additionally, a more uniform weld hardness is attained by heating the shafts prior to welding. The two shaft sections 1, 2 are clamped so that the shaft can be turned slowly, at a peripheral linear speed of approximately 500 to 600 millimeters per minute. The turning of the shaft being accomplished either by the use of the main rotary system of the turbine and the aid of a hydraulic motor or by a turning device used specifically for the installation.

While the two shaft sections, which are centered relative to each other, are turning, the welding groove 5 between the built-up weld portions of the shafts 1, 2 is filled with a welding material 8. The welding material 8 is preferably the same material used in forming the built-up portions 4 on the shaft ends. An automatic welding process is employed to provide a uniform weld structure and the weld material used will determine the specific type of welding process employed. In order to insure a proper centering of the shafts, it is advantageous to keep one shaft at a slightly higher temperature than the other shaft, for example by a temperature difference of approximately 20° C.

The heating of the shaft can be accomplished in a known manner by electrical resistors which are wound around the coupling ends or by radiators that are located in casings and placed around the shaft. The preheating could also be accomplished by the use of air which is heated to approximately 300° to 400° C.

Upon completion of the welding, the shaft sections and the welding seam are finished and checked for faults.

In order to separate the two shaft sections in the event of a mechanical break-down, the welding seam can be easily positioned in a bearing block at the separating plane of the welding seam. The positioning can be accomplished in a supporting carriage which is mounted in the structure similar to a support used in connection with a lathe. Once the shafts are arranged in the desired position, the welding seam and the welding ring can be cut off. The shaft-turning system of the turbine, which may use a hydrostatic motor, provides an easy means of setting the proper cutting speed. In order to re-connect the two shaft sections, a new welding ring 6 is installed and the two shaft sections 1 and 2 are then welded together again.

An advantage of the method proposed by the invention, when compared with the known shaft couplings, is that the steps of forming the weld portion on the end faces of the shafts and machining a welding groove can be performed in the manufacturing plant. Completion of the joint may then be done at the set-up site inside, for example, an assembled turbine and generator structure. Only the individual steps of welding the two shaft sections together needs to be performed at the assembly site. The method of the present invention furthermore eliminates the need for centering and preparing bores for coupling bolts at the installation site.

The principles, preferred embodiments and modes of operation of the present invention have been described in the foregoing specification. The invention which is intended to be protected, is not, however, to be limited to the particular forms disclosed, since these are illustrative and not restrictive examples. Variations and changes may be made by those skilled in the art without departing from the spirit and scope of the present invention.

I claim:

1. A method of joining together rotary shafts of two separate machine units, said shafts providing an operative connection between the two machine units, at least one of the shafts being supported by a bearing adjacent the joint, said method comprising the steps of:
   mounting a shaft within each of two separate machine units;
   supporting at least one of the shafts adjacent a shaft end with a bearing;
   welding a built-up portion on the end of each shaft;
   annealing the shafts;
   forming a welding groove in the built-up portion of the shafts;
   transporting the machine units including the shafts to an assembly site;
   placing a welding ring onto the end of said shaft of one machine unit;
   positioning the other machine unit adjacent the first unit with the respective shafts in alignment and in engagement with the welding ring;
   heating the shafts to a predetermined temperature to prevent damage to the bearing;
   rotating the shafts at a predetermined peripheral linear speed; and
   depositing weld material in the welding groove to join the shafts and form a machine having an integral rotary power shaft operatively connecting two machine units.

2. The method according to claim 1 wherein the built-up portion is provided on a radial face of said shafts.

3. The method according to claim 1 wherein the shafts are heated to a maximum of 250° C. prior to depositing the weld material in the welding groove.

4. The method according to claim 1 wherein the built-up weld portion is a low-alloy steel.

5. The method according to claim 1 wherein the shafts are rotated at a peripheral linear speed between 500 and 600 millimeters per minute.

6. The method as in claim 1 wherein the step of heating the shaft includes heating one shaft to a slightly higher temperature than the other shaft.

7. The method as in claim 6 wherein the one shaft is heated to a temperature approximately 20° C. higher than the other shaft.

* * * * *